(12) United States Patent
Carter (10) Patent No.: US 8,821,121 B2
(45) Date of Patent: Sep. 2, 2014

(54) SPEED REGULATABLE ROTOR ASSEMBLY FOR WIND TURBINE

(76) Inventor: Mac E. Carter, Ashtabula, OH (US)

(*) Notice: Subject to any disclaimer, the term of this patent is extended or adjusted under 35 U.S.C. 154(b) by 817 days.

(21) Appl. No.: 12/966,909

(22) Filed: Dec. 13, 2010

(65) Prior Publication Data

US 2012/0070286 A1    Mar. 22, 2012

Related U.S. Application Data

(60) Provisional application No. 61/285,987, filed on Dec. 12, 2009.

(51) Int. Cl.
*F03D 3/06* (2006.01)

(52) U.S. Cl.
USPC .......... 416/44; 416/88; 416/89; 416/135

(58) Field of Classification Search
USPC .......... 416/40, 41, 44, 87, 88, 89, 117, 119, 416/131, 135, 136, 137
See application file for complete search history.

(56) References Cited

U.S. PATENT DOCUMENTS

| | | | |
|---|---|---|---|
| 690,950 A * | 1/1902 | Hau | 416/14 |
| 1,986,752 A * | 1/1935 | Rorvik | 416/89 |
| 2,037,528 A * | 4/1936 | Miller | 416/23 |
| 2,050,142 A * | 8/1936 | White | 416/135 |
| 2,145,413 A * | 1/1939 | Belfield | 416/88 |
| 2,505,969 A * | 5/1950 | Jacobs | 416/136 |
| 3,701,612 A * | 10/1972 | Breuner | 416/141 |
| 3,891,347 A * | 6/1975 | Jacobs et al. | 416/32 |
| 4,068,131 A * | 1/1978 | Jacobs et al. | 290/55 |
| 4,257,740 A | 3/1981 | Duez | |
| 4,632,637 A * | 12/1986 | Traudt | 416/41 |
| 4,909,703 A * | 3/1990 | Jacobs | 416/89 |
| 8,152,466 B2 * | 4/2012 | Gandhi | 416/88 |
| 2012/0070286 A1 * | 3/2012 | Carter | 416/44 |
| 2012/0128491 A1 * | 5/2012 | Sun | 416/140 |

FOREIGN PATENT DOCUMENTS

JP    2014037815 A *  2/2014

* cited by examiner

*Primary Examiner* — Edward Look
*Assistant Examiner* — Christopher R Legendre
(74) *Attorney, Agent, or Firm* — L.C. Begin & Associates, PLLC.

(57) ABSTRACT

A rotor assembly for a wind turbine includes a hub adapted to be carried by a shaft of the wind turbine, a plurality of prop arms extending from the hub, a plurality of blades carried by the plurality of prop arms, and a rotor speed regulating mechanism adapted to alter a pitch of the plurality of blades responsive to varying wind speeds, thereby regulating the speed of the plurality of blades.

7 Claims, 6 Drawing Sheets

SPEED REGULATABLE ROTOR ASSEMBLY FOR WIND TURBINE

CROSS REFERENCE TO RELATED APPLICATION

This application claims the benefit of U.S. Provisional Application No. 61/285,987 filed on Dec. 12, 2009, the disclosure of which is incorporated by reference.

FIELD OF THE INVENTION

The present disclosure generally relates to wind turbines, and, more specifically, to a speed regulatable rotor assembly for a wind turbine.

BACKGROUND OF THE INVENTION

Energy generated from natural resources, such as sunlight and wind, is desirable due to the environmental-friendly factor associated therewith. For example, wind turbines are known for converting rotational movement of the turbine blades, caused by the wind, into electricity. Specifically, the rotation of turbine blades is utilized for the rotation of a shaft, connected to a generator, for producing electricity.

To achieve an optimum output of a wind turbine, the rotation of the turbine blades need to be regulated with varying wind speeds/conditions. Specifically, the turbine blades should be allowed to rotate at a set rated revolution per minute (rpm) for achieving the optimum output. However, to maintain the set rated rpm of the turbine blades may be difficult during sudden rise in wind speed or storm. Specifically, rise in wind speed may cause over speeding of the turbine blades, which may cause damage to the wind turbine. Further, fixing such damages may become expensive and time consuming affair.

SUMMARY OF THE INVENTION

In one aspect of the embodiments of the present invention, a rotor assembly for a wind turbine is provided. The rotor assembly includes a hub adapted to be carried by a shaft of the wind turbine, a plurality of prop arms extending from the hub, a plurality of blades carried by the plurality of prop arms, and a rotor speed regulating mechanism adapted to alter a pitch of the plurality of blades responsive to varying wind speeds, thereby regulating the speed of the plurality of blades.

In another aspect of the embodiments of the present invention, a rotor assembly for a wind turbine is provided. The rotor assembly includes a hub adapted to be carried by a shaft of the wind turbine, a plurality of rods coupled with the hub, each of the plurality of rods having a threaded portion, a plurality of prop arms slidably carried by the plurality of rods, a plurality of blades coupled with the plurality of prop arms, the plurality of blades adapted to receive the threaded portions of the plurality of rods; and a rotor speed regulating mechanism adapted to uniformly alter the pitch of the plurality of blades with different wind speed, thereby regulating the speed of the plurality of blades.

BRIEF DESCRIPTION OF THE DRAWINGS

The advantages and features of the present disclosure will become better understood with reference to the following detailed description and claims taken in conjunction with the accompanying drawings, in which:

Like reference numerals refer to like parts throughout the description of the drawings.

DETAILED DESCRIPTION OF THE INVENTION

The exemplary embodiments described herein detail for illustrative purposes are subject to many variations in structure and design. It should be emphasized, however, that the present disclosure is not limited to a particular speed regulatable rotor assembly for a wind turbine, as shown and described. It is to be understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "a" and "an" herein do not denote a limitation of quantity, but rather denote the presence of at least one of the referenced item. The use of terms "including," "comprising," or "having" and variations thereof herein is meant to encompass the items listed thereafter and equivalents thereof as well as additional items.

The present disclosure provides a speed regulatable rotor assembly for a wind turbine. Specifically, the rotor assembly of present disclosure is adapted to regulate a rotational speed thereof under varying wind speeds/conditions, thereby allowing the wind turbine to rotate at a substantially uniform speed even with the varying wind speeds/conditions.

Figure 1:
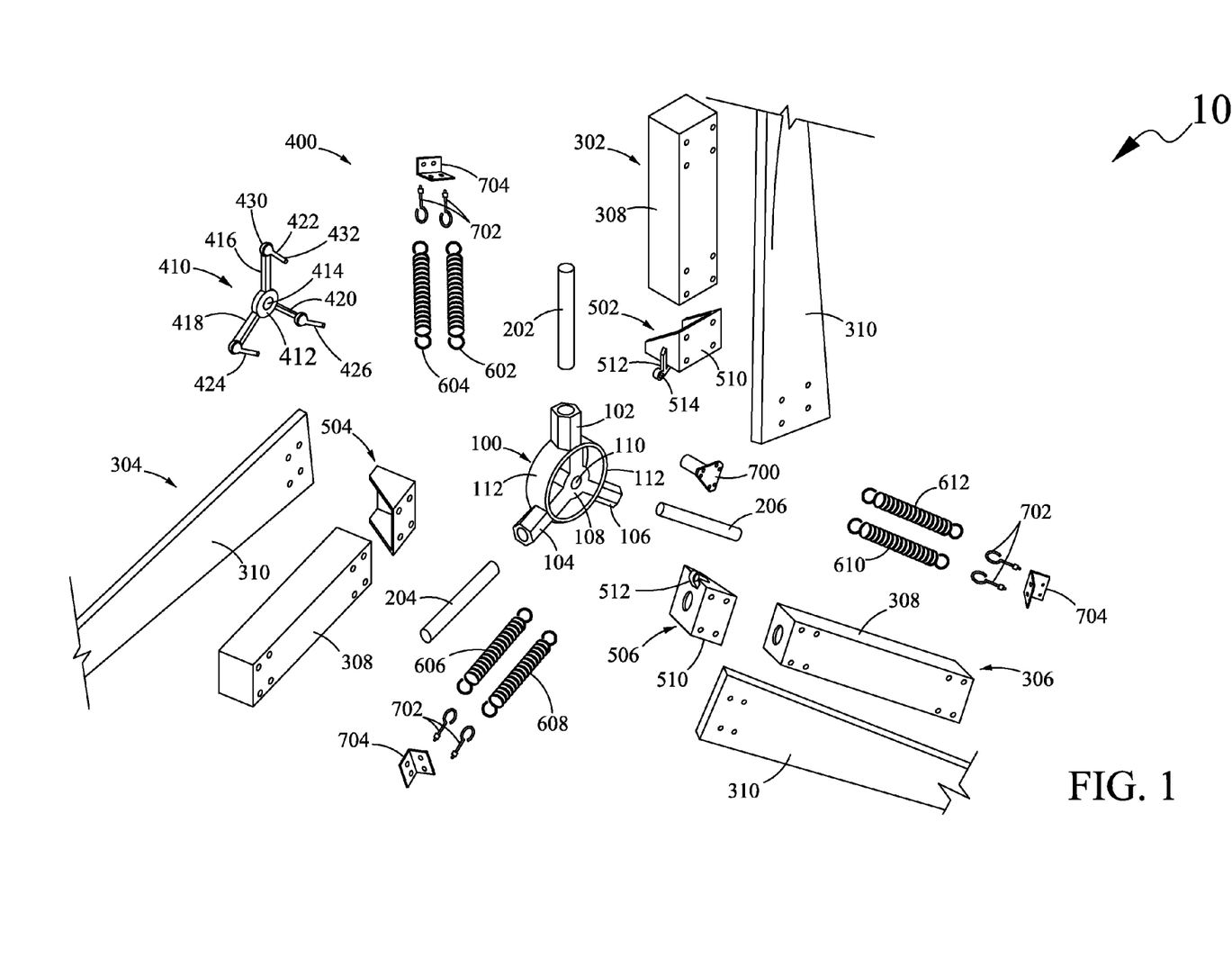
FIGS. 1-2 are perspective views of an embodiment of a speed regulatable rotor assembly for a wind turbine.
Figure 2:
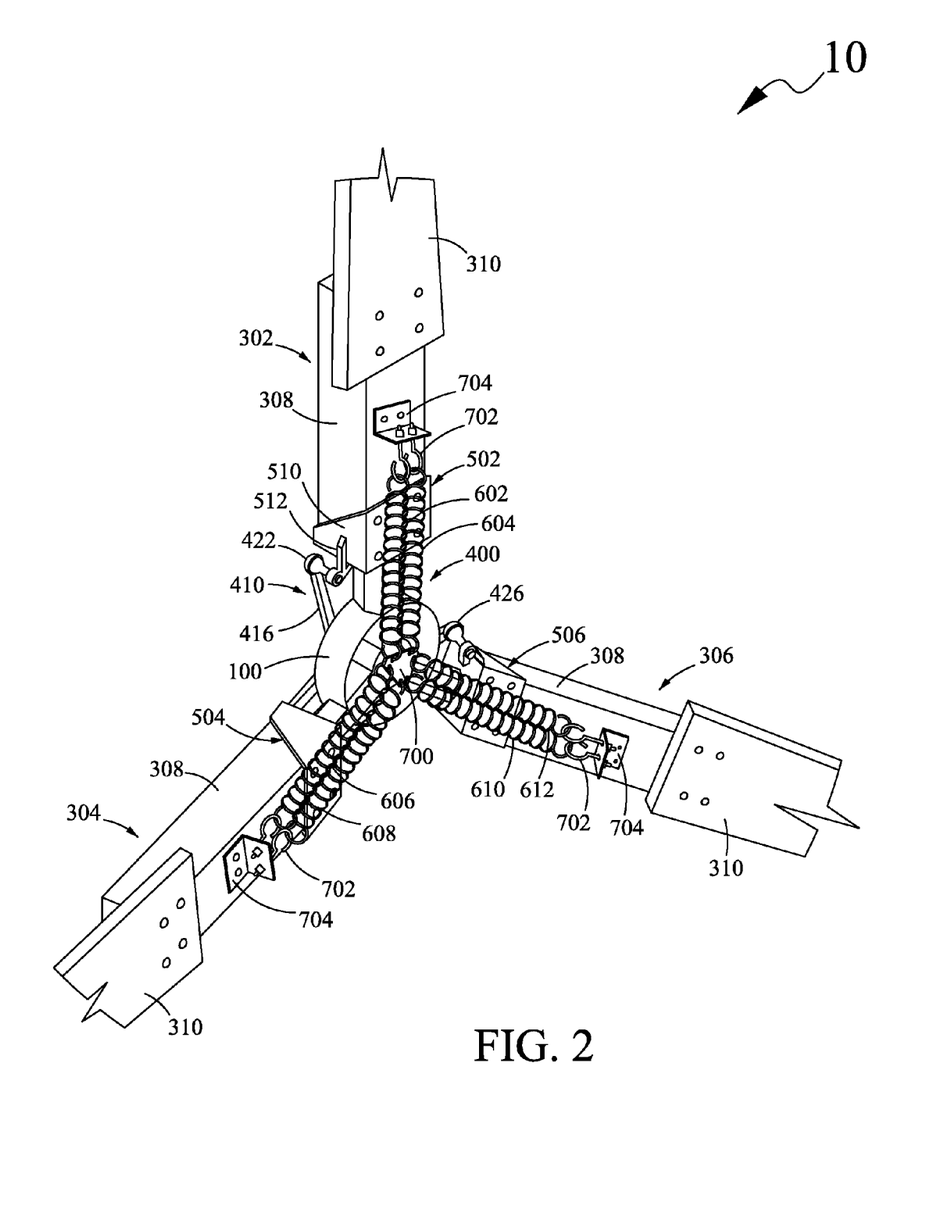

Referring to FIGS. 1-2, a speed regulatable rotor assembly for a wind turbine (hereinafter referred to as a rotor assembly 10) may include a hub 100. The hub 100 may include a plurality of hub arms 102, 104, and 106. The arms of the plurality of hub arms 102, 104, 106 may be spaced apart equiangularly. Further, the arms of the plurality of hub arms 102, 104, 106 may be connected to each other at an end portion (not numbered) thereof for configuring a central portion 108 of the hub 100. The hub 100 may include a hole 110 carried by the central portion 108 thereof. The hub 100 may also include a plurality of curved plates 112 connecting the adjacent hub arms for providing a circular structure to the hub 100. It is to be understood that the structural configuration of the hub 100 should not be considered as limiting to the present disclosure. For example, a hub of the rotor assembly 10 may be configured to have disc-shaped structure with a hole, such as the hole 110, configured at a center of the hub. Further, the hub may or may not include a plurality of hub arms, such as the plurality of hub arms 102, 104, 106.

The rotor assembly 10 may also include a plurality of prop arms 202, 204 and 206. In the present embodiment, the plurality of prop arms 202, 204, 206 may be cylindrical rods (solid or hollow) extending from the hub 100. Specifically, the plurality of prop arms 202, 204, 206 may be coupled with the plurality of hub arms 102, 104, 106, respectively. In the present embodiment, the plurality of prop arms 202, 204, 206 may be removably coupled, such as threadably coupled, with the plurality of hub arms 102, 104, 106, respectively. Otherwise the plurality of prop arms 202, 204, 206 may be rigidly coupled, such as welded, with the plurality of hub arms 102, 104, 106, respectively.

The rotor assembly 10 may also include a plurality of blades 302, 304, and 306. In the present embodiment, each of the plurality of blades 302, 304, 306 may include a blade base 308 and a blade plate 310 coupled with the blade base 308. For example, the blade plate 310 may be coupled with the blade base 308 (as shown in FIG. 2) using suitable fasteners such as, for example, screws or nut and bolt arrangements. In the present embodiment, the blade base 308 of each of the plurality of blades 302, 304, 306 may be a hollow cuboidal structure. Further, the blade plate 310 of each of the plurality of blades 302, 304, 306 may be an elongated flat structure having a cross section of an airfoil.

The plurality of blades 302, 304, 306 may be carried by the plurality of prop arms 202, 204, 206. Specifically, the blade base 308 of each of the plurality of blades 302, 304, 306 may be adapted to receive the corresponding prop arms 202, 204, 206. For example, a bottom portion (not numbered) of the blade base 308 of each of the plurality of blades 302, 304, 306 may include an opening adapted to receive the corresponding prop arms 202, 204, 206 therethrough. This may allow the plurality of blades 302, 304, 306 to slidably move with respect to the plurality of prop arms 202, 204, 206.

The rotor assembly 10 may also include a speed regulating mechanism 400. The speed regulating mechanism 400 may be adapted to regulate the speed of the plurality of blades 302, 304, 306 in varying wind speeds/conditions, which is explained below in greater detail. In the present embodiment, the speed regulating mechanism 400 may include a synchronizer 410. The synchronizer 410 may include a central portion 412 having a disc-shaped structure. The central portion 412 may include a hole 414. The synchronizer 410 may also include a plurality of links 416, 418, and 420 extending from the central portion 412. The each link of the plurality of links 416, 418, 420 may be spaced apart equiangularly from the adjacent links. In addition, central portion 412 is configured to be rotatable independently of hub 100. In a particular embodiment, central portion 412 rotates on a shaft coupled to hub 100.

The synchronizer 410 may further include a plurality of ball and socket couplers 422, 424, and 426 carried by the plurality of links 416, 418, 420, respectively. Specifically, each of the plurality of ball and socket couplers 422, 424, 426 may include a cup portion 430 rigidly coupled, such as welded, with the corresponding links 416, 418, 420. Further, the plurality of ball and socket couplers 422, 424, 426 may be positioned away from the central portion 412. Each coupler of the plurality of ball and socket couplers 422, 424, 426 may also include a ball arm 432. The ball arm 432 may be coupled with the cup portion 430 so as to enable adapted to a circular-pivotal movement of the ball arm 432 with respect to the cup portion 430. Ball arm 432 is also threadedly or otherwise adjustably coupled to a protruding portion 512 configured on the cap portion 510, as described below.

The speed regulating mechanism 400 may also include a plurality of blade shoes 502, 504, and 506 carried by the plurality of blades 302, 304, 306, respectively. Specifically, the plurality of blade shoes 502, 504, 506 may be carried by the blade base 308 of the corresponding blades 302, 304, 306 such that the plurality of blade shoes 502, 504, 506 are positioned in proximity to the hub 100. In the present embodiment, each of the plurality of blade shoes 502, 504, 506 may include a cap portion 510. The cap portion 510 may be configured to conform to the bottom portion of the blade base 308 such that the cap portion 510 may be adapted to receive the bottom portion and be coupled with the bottom portion using a suitable fastener, such as screws or nut and bolt arrangements, as shown in FIG. 2. Each blade shoe of the plurality of blade shoes 502, 504, 506 may also include a protruding portion 512 configured on the cap portion 510. The protruding portion 512 may include a hole 514. Each blade shoe of the plurality of blade shoes 502, 504, 506 may be further adapted to be coupled with the plurality of ball and socket couplers 422, 424, 426, respectively. Specifically, the ball arm 432 of each of the plurality of ball and socket couplers 422, 424, 426 may be adjustably received in the hole 514 of the protruding portion 512 of the corresponding blade shoes 502, 504, 506, as shown in FIG. 2. Hole 514 may be threaded to receive therein a complementarily threaded portion of ball arm 432. Alternatively, hole may be otherwise configured to enable and maintain adjustment of the connection between the protruding portion and the ball arm, such that the length of the ball arm extending between the protruding portion and the ball socket joint is adjustable to (and maintainable at) a desired length. This enables adjustment of the initial blade attack angle to meet the requirements of a particular application.

The speed regulating mechanism 400 may further include a plurality of springs 602, 604, 606, 608, 610, and 612. The plurality of springs 602-612 may extend from the hub 100 to the plurality of blades 302, 304, 306. For example, as shown in FIG. 2, the springs 602, 604 may extend between the hub 100 and the blade 302. Similarly, the springs 606, 608 may extend between the hub 100 and the blade 304; and the springs 610, 612 may extend between the hub 100 and the blade 306.

In the present embodiment, the plurality of springs 602-612 may be coupled to the hub 100 and the plurality of blades 302, 304, 306 with a central connector 700 and a plurality of threaded eyebolts 702. As shown in FIG. 2, an end portion of each of the plurality of springs 602-612 may be coupled with the central connector 700 and an opposite end portion of each of the plurality of springs 602-612 may be coupled with an associated one of the plurality of blades 302, 304, 306. Specifically, the central connector 700 may be coupled with the central portion 108 of the hub 100 by a suitable attachment means, such as threads or welding. Further, the central connector 700 may include a plurality of holes adapted to receive an end loop of each of the plurality of springs 602-612. The plurality of eyebolts 702 may be coupled with the blade base 308 of each of the plurality of blades 302, 304, 306 with mounting brackets 704. The plurality of eyebolts 702 may be adapted to receive an opposite end loop of each of the plurality of springs 602-612, as shown in FIG. 2. Therefore, by rotating the plurality of eyebolts 702 tension of the plurality of springs 602-612 may be altered.

The speed regulating mechanism 400 of the present embodiment, particularly, the synchronizer 410, the plurality of blade shoes 502, 504, 506, and the plurality of springs 602-612, may be adapted to maintain a uniform pitch of the plurality of blades 302, 304, 306. Moreover, the speed regulating mechanism 400 may be also adapted to uniformly alter the pitch of the plurality of blades 302, 304, 306 according to different wind speeds/conditions, for regulating the speed of the plurality of blades 302, 304, 306. This may be further explained in greater detail in conjunction with the FIG. 3.

Figure 3:
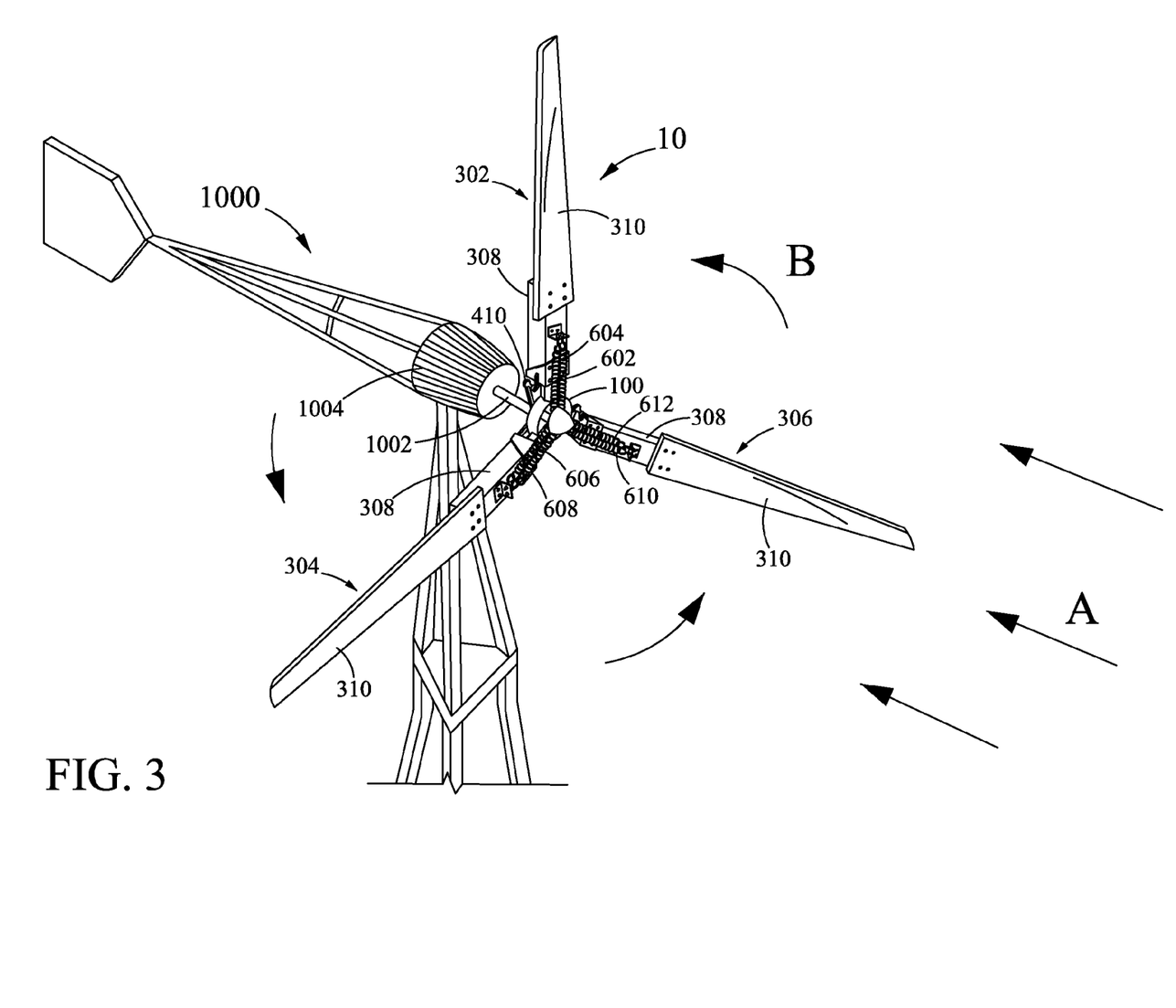
FIG. 3 is an environment in which the rotor assembly of FIG. 2 may be used in a wind turbine.

Referring now to FIG. 3, the rotor assembly 10 of the present disclosure may be operatively coupled to and utilized in conjunction with various components of a wind turbine 1000 for generating electricity. The rotor assembly 10 may be adapted to be mounted on a shaft 1002 of the wind turbine 1000. Specifically, the hub 100 of the rotor assembly 10 may be mounted on the shaft 1002. For example, the shaft 1002 may be received through the hole 110 (shown in FIG. 1) of the central portion 108 of the hub 100 and thereafter the shaft 1002 may be rigidly coupled with hub 100 using a suitable coupling mechanism, such as bolts or allen screws. Therefore, the shaft 1002 may be adapted to rotate with the rotation of hub 100, which may rotate with the rotation of plurality of blades 302, 304, 306, caused by the wind.

Further, the synchronizer 410 of the speed regulating mechanism 400 may be also received by the shaft 1002 and positioned adjacent to the hub 100. It is to be understood that the synchronizer 410 may be received by the shaft 1002 prior to receiving the hub 100. Further, the synchronizer 410 may be also rigidly coupled with the shaft 1002 using a suitable coupling mechanism, such as bolts or allen screws. Moreover, the synchronizer 410 may be coupled with the plurality of blades 302, 304, 306. Particularly, the plurality of ball and socket couplers 422, 424, 426 may be coupled with the plurality of blade shoes 502, 504, 506, as explained in conjunction with FIG. 1.

Once the rotor assembly 10 is mounted on the shaft 1002, the plurality of blades 302, 304, 306 of the rotor assembly 10 may start rotating with the blowing wind. Initially, the plurality of blades 302, 304, 306 may be oriented such that an angle of attack of the wind may be 25 degrees. Specifically, considering a plane carrying the hub 100 of the rotor assembly 10 to be perpendicular to the wind direction (shown with arrow A), a plane carrying any blade of the plurality of blades 302, 304, 306 may be oriented 25 degrees to the plane of the hub 100, thereby achieving a 25 degree angle of attack of the wind. It is to be understood that by adjusting the ball sockets and the synchronizer 410, the plurality of blades 302, 304, 306 may be adapted to be oriented such that the angle of attack of the wind may be 25 degrees on start-up.

The wind hits the plurality of blades 302, 304, 306, and causes the plurality of blades 302, 304, 306 to rotate in a counter clockwise direction (shown with arrow B). Specifically, a lift at the back of the plurality of blades 302, 304, 306 allows the plurality of blades 302, 304, 306 to rotate and gain rotational speed with an increase in the wind speed. The gain in the rotational speed causes a centrifugal force to come into play and causes the plurality of blades 302, 304, 306 to move outwardly, away from the hub 100. The outward movement of the plurality of blades 302, 304, 306 may cause the expansion of the plurality of springs 602-612. Further, the plurality of blades 302, 304, 306 may twist with the outward movement thereof. Moreover, when the plurality of blades 302, 304, 306 move outwardly, the synchronizer 410 may allow the plurality of blades 302, 304, 306 to remain synchronized (face same angle of attack). Specifically, the ball and socket couplers 422, 424, 426 of the synchronizer 410 may swivel with the twisting of the plurality of blades 302, 304, 306 for keeping the plurality of blades 302, 304, 306 synchronized. Further, the outward movement of the plurality of blades 302, 304, 306 caused by the centrifugal force may enable in gaining the rotational speed. The gain in the rotational speed may increase the lift and decrease the drag on the plurality of blades 302, 304, 306.

A further increase in the wind speed may cause the plurality of blades 302, 304, 306 to gain more rotational speed and reach a rated revolutions per minute (rpm) or 100 percent efficiency. The terms "rated rpm or 100 percent efficiency" relate to a specific rotational speed of the plurality of blades 302, 304, 306, which in turn rotate the shaft 1002 to generate optimum electricity. Specifically, the "rated rpm or 100 percent efficiency" is a maximum rotational speed of the plurality of blades 302, 304, 306 which is manageable and which may cause optimum generation of electricity. It is to be understood that the shaft 1002 may be operatively coupled with a generator 1004 for the generation of electricity.

As explained above, the plurality of blades 302, 304, 306 rotating at the rated rpm may produce optimum electricity. Therefore, when the wind speed further increases, the plurality of blades 302, 304, 306 may tend to exceed the rated rpm and the speed regulating mechanism 400 may come into play to help prevent the blade rotational speed from exceeding the rated rpm. Specifically, the further increase in the wind speed may cause an increase in the rotational speed of the plurality of blades 302, 304, 306 which may change the angle of attack of the wind on the plurality of blades 302, 304, 306. Further, the change in the angle of attack may change the lift and the drag on the plurality of blades 302, 304, 306. The change in the angle of attack, the lift, and the drag causes the plurality of blades 302, 304, 306 to slow down (reduce the rotational speed).

In one embodiment, the connections between the ball arms 432 and the protruding portions 512 are adjusted to provide an initial 25 degree angle of attack for all blades. That is, when the blades are not rotating, the angle of attack is 25 degrees. As wind impinges on the blades, the blades begin to rotate, eventually reaching the rated RPM. As the blades begin to rotate and are forced radially outward, because of the connections between synchronizer central portion 412, the ball couplers and the protruding portions 512, the ball arms 432 rotate within their respective sockets to enable and guide rotation of the blades on the prop arms, thereby changing the angle of attack. In this manner, the angles of attack of the blades are dynamically adjusted according to the positions of the blades along the prop aims. These positions, in turn, vary with the speed of the wind incident on the blades.

Specifically, the plurality of springs 602-612 may pull the plurality of blades 302, 304, 306 toward the hub 100 by overcoming the centrifugal force, when the plurality of blades 302, 304, 306 may tend to exceed the rated rpm. Further, when the plurality of blades 302, 304, 306 may move towards the hub 100, the plurality of blades 302, 304, 306 may twist, and change the angle of attack of the wind thereon. This may cause change in the lift and the drag on the plurality of blades 302, 304, 306. The changing lift and the drag on the plurality of blades 302, 304, 306 may cause the plurality of blades 302, 304, 306 to flutter. The fluttering action of the plurality of blades 302, 304, 306 may continue until the plurality of blades 302, 304, 306 slow to attain the rated rpm and thereby avoiding over-speeding of the plurality of blades 302, 304, 306.

As the wind speed on the blades increases, the blades tend to move farther radially outwardly. The farther along the prop arms the blades move in response to increased rotational speed of the blades, the greater the degree of rotation of the blades about the axes of the prop arms, and the greater the resulting drag on the blades due to the change in angle of attack. As the drag increases, the blades rotational speed of the blades decreases. As the rotational speed decreases, the blades retract along the prop arms toward the hub and the degree of rotation of the blades about the prop arm axes decreases, thereby decreasing the drag and enabling a greater rotational speed responsive to a given wind speed. Rotation of the blades about the prop arm axes changes the angles of attack of the blades, thereby changing the blade lift and drag characteristics. Thus, the embodiments of the system described herein dynamically adjust the attack angles (and, therefore, the drag characteristics) of the blades responsive to the wind speed. In this manner, the rotational speed of the blades dynamically adjusts to fluctuations in wind speed to maintain the rotational speed within a range centered about the rated RPM, thereby minimizing the time of the blades at speed in excess or below the rated RPMs, and maximizing system efficiency.

Further, when the wind speed reduces the rotational speed of the plurality of blades 302, 304, 306 may also reduce. The reduction in the rotational speed of the plurality of blades 302, 304, 306 may allow the plurality of springs 602-612 to contract and pull of the plurality of blades 302, 304, 306 towards the hub 100. Therefore, when the wind ceases the plurality of blades 302, 304, 306 may stop rotating and may attain the initial position (25 degrees of angle of attack of the wind). In this position, the entire plurality of blades is used as a start-up root to get the plurality of blades moving in a low wind.

In a particular embodiment, a cable or similar device is provided which connects the springs 602, 604, 606, 608, 610, and 612 proximate the center of hub 100. The cable acts to secure the springs to the unit in case the springs break, or in case an opposite end of a spring detaches from the blade. The connections between the cable and the springs are configured so that the ends of the springs exert substantially equal tension forces on equilaterally spaced apart portions of the cable. The tension in the cable increases as the blades move radially outwardly, and lessens as the blades move inwardly. Thus, the cable serves as a mechanism for maintaining tension in the springs during operation of the system.

If the end of a spring becomes detached from a respective blade or otherwise fails, the tension in the cable will be reduced because the detached spring no longer exerts a tension force on the cable. Because there is no now mechanism to draw the blade back toward the hub, the detached blade will tend to move outwardly as far as possible, thereby maximizing its drag characteristics due to rotation about the prop arm axis. In addition, the remaining springs will attempt to take up the extra slack in the cable. The extra cable slack permits the blades attached to these remaining springs to move farther outward radially than would otherwise be the case. This increases the drag on these blades, tending to slow down rotation. Thus, the cable-spring configuration just described will tend to slow down blade rotation to aid in preventing an overspeed condition due to the damaged blade connection. Even if a single spring becomes detached from a blade, the slack in the cable will increase and the blade to which the spring was attached will be able to move farther radially outwardly because there will be less spring force restraining the blade and less spring force acting on the cable.

Parameters such as the lengths of the links 416, 418, and 420, the positions of the protruding portions on the cap portions, the connections between the ball joints and the protruding portions, the tensions in the springs and other relevant parameters may be iteratively and/or analytically optimized using known methods so as to provide a desired initial angle of attack and the desired dynamic response of the blade to wind conditions.

Figure 4:
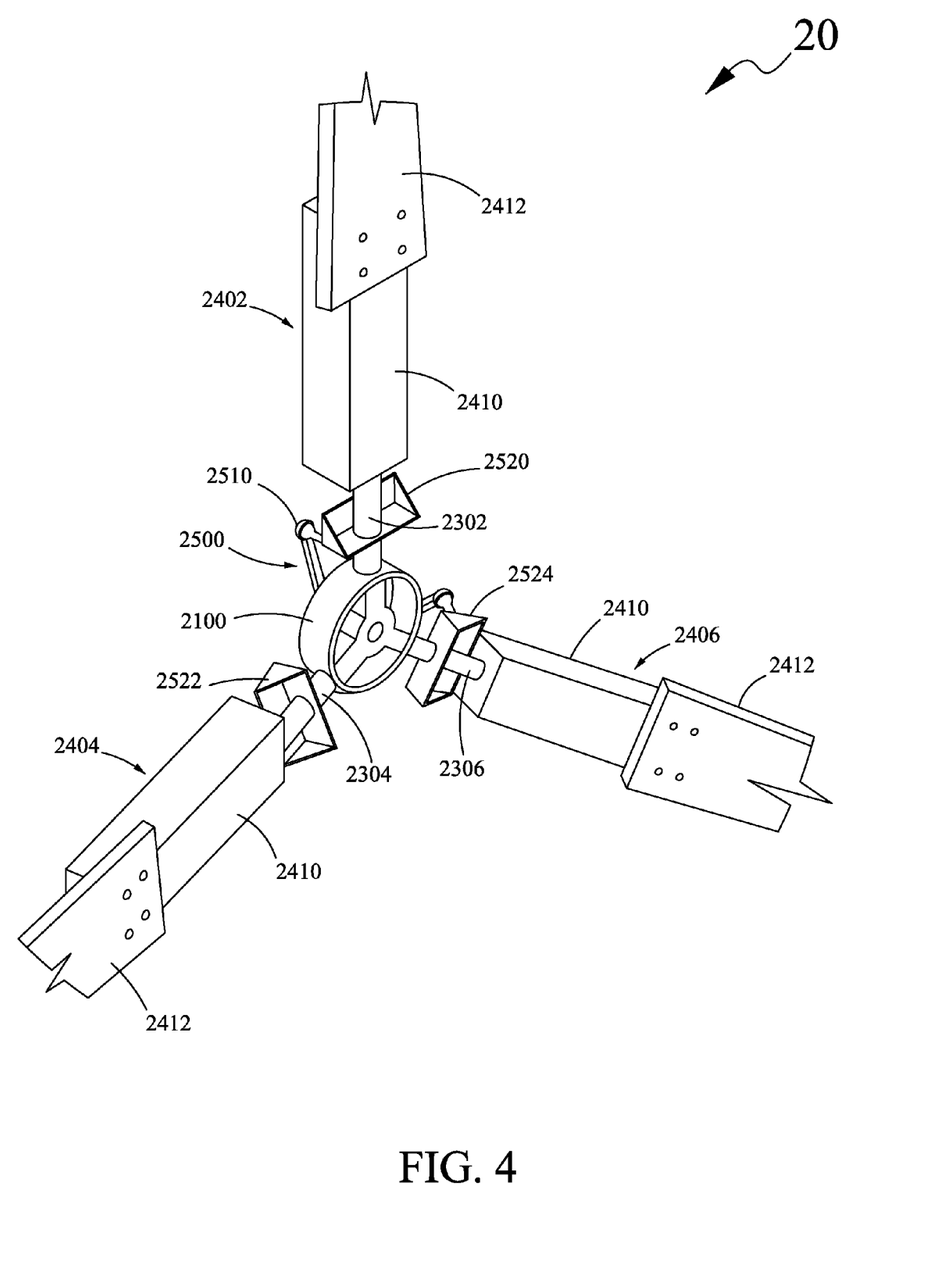
FIG. 4 is a perspective view of another embodiment of a speed regulatable rotor assembly for a wind turbine.
Figure 5:
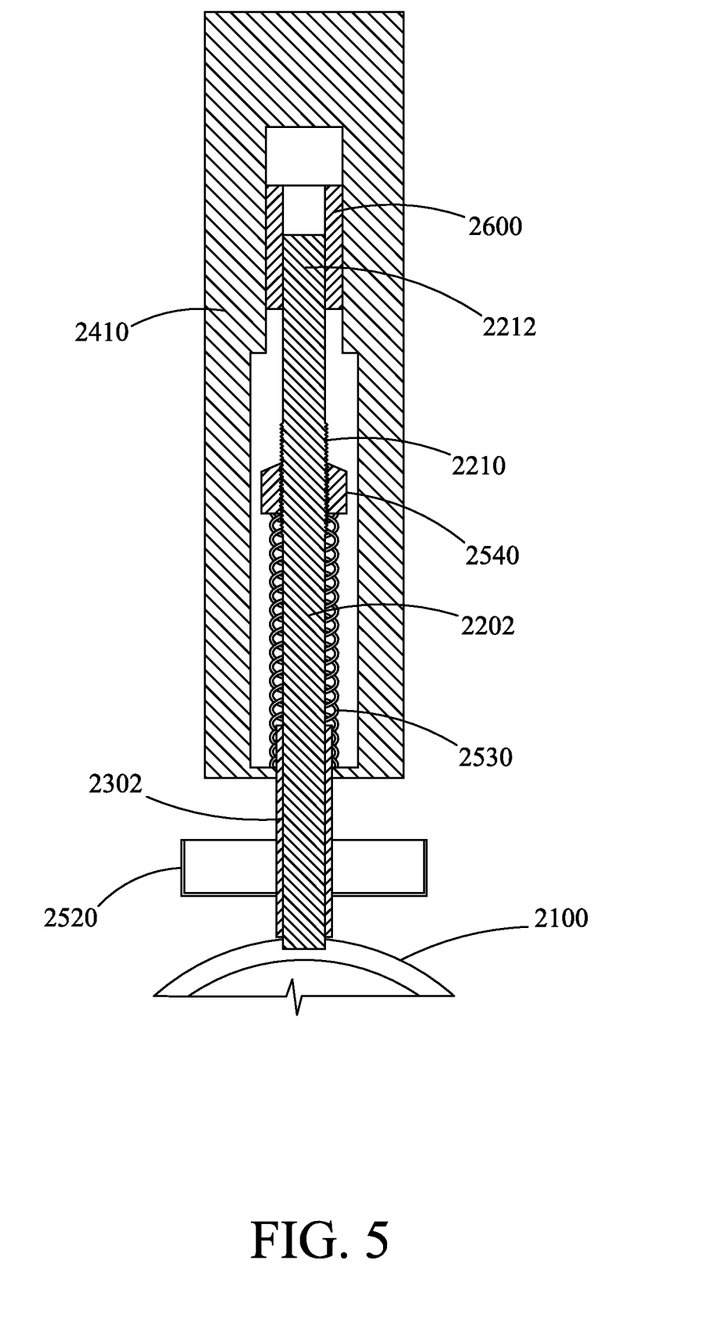
FIG. 5 is a cross-sectional view a blade of the rotor assembly of FIG. 4.

Referring now to FIG. 4, a speed regulatable rotor assembly for a wind turbine (hereinafter referred to as rotor assembly 20) may include a hub 2100. The hub 2100 may configured to be a disc shaped structure. It is to be understood that shape of the hub 2100 should not be considered as limitation to the present disclosure. The rotor assembly 20 may also include a plurality of rods adapted to be coupled with the hub 2100. Specifically, as shown in FIG. 5, the rotor assembly 20 may include a plurality of rods, such as a rod 2202, coupled with the hub 2100. It is to be understood that the rotor assembly 20 of the present embodiment may include three rods, such the rod 2202, extending equiangularly from the hub 2100. In the present embodiment, each of the plurality of rods may be a solid cylindrical structure. Further, each of the plurality of rods may include a threaded portion. For example, as shown in FIG. 5, the rod 2202 may include a threaded portion 2210, away from the hub 2100.

Referring back to FIG. 4, the rotor assembly 20 may also include a plurality of prop arms 2302, 2304 and 2306. The plurality of prop arms 2302, 2304, 2306 may be slidably carried by the plurality of rods. For example, as shown in FIG. 5, the prop arm 2302 may be slidably carried by the rod 2202. Specifically, the prop arm 2302 may be a hollow cylindrical rod adapted to be slidably received by the rod 2202. Similarly, the prop arms 2304, 2306 may be slidably carried by the corresponding rods (not shown).

The rotor assembly 20 may also include a plurality of blades 2402, 2404, and 2406. Each blade of the plurality of blades 2402, 2404, 2406 may include a blade base 2410 and a blade plate 2412. The blade base 2410 may be a hollow cuboidal structure adapted to be rigidly coupled with a prop arm. For example, as shown in FIG. 5, the blade base 2410 may be rigidly coupled, such as welded, with the prop arm 2302. Further, the blade base 2410 may be adapted to receive the threaded portion 2210 of the rod 2202. Similarly, the blade base 2410 of the blades 2404, 2406 may be rigidly coupled with the corresponding prop arms 2304, 2306 and adapted to receive the corresponding rods (not shown) therein.

Referring back to FIG. 4, the rotor assembly 20 may also include a speed regulating mechanism 2500. The speed regulating mechanism 2500 may include a synchronizer 2510. The structural configuration and the function of the synchronizer 2510 is similar to the synchronizer 410 of the speed regulating mechanism 400, accordingly description of the synchronizer 2510 is avoided for the sake of brevity. The speed regulating mechanism 2500 may also include a plurality of blade shoes 2520, 2522 and 2524. The plurality of blade shoes 2520, 2522, 2524 may be rigidly coupled, such as welded, with the plurality of prop arms 2302, 2304, 2306, as shown in FIG. 4. In the present embodiment, each of the plurality of blade shoes 2520, 2522, 2524 may be configured to be an L-shaped bracket with side edges configured with triangular flanges. Further, the plurality of blade shoes 2520, 2522, 2524 may be adapted to be coupled with the plurality of ball and socket couplers (not numbered) of the synchronizer 2510, as shown in FIG. 4.

The speed regulating mechanism 2500 may also include a plurality of springs adapted to encircle the plurality of rods. For example, a spring 2530 may encircle the rod 2202, as shown in FIG. 5. Similarly, the speed regulating mechanism 2500 may also include two more springs adapted to encircle corresponding rods adapted to be received within the blade base 2410 of the blades 2404, 2406. The speed regulating mechanism 2500 may further include a plurality of nuts carried by a threaded portion of the corresponding rods. For example, as shown in FIG. 5, a nut 2540 may be carried by the threaded portion 2210 of the rod 2202. The plurality of nuts may be adapted to be threadably moved along the threaded portions of the corresponding rods for adjusting tension of the plurality of springs. For example, the nut 2540 may be threadably moved along the threaded portion 2210 of the rod 2202 for adjusting tension of the spring 2530.

As explained earlier, the plurality of prop arms 2302, 2304, 2306 may be slidably coupled with the corresponding rods, and the blade base 2410 of the plurality of blades 2402, 2404, 2406 may be rigidly coupled with the corresponding prop arms 2302, 2304, 2306. Therefore, as shown in FIG. 5, the spring 2530 and the nut 2540 may tend to push the blade base 2410 along with the prop arm 2302 and the blade shoe 2520 towards the hub 2100. Further, it is to be understood that by adjusting a position of the nut 2540 with respect to the threaded portion 2210 a tension of the spring 2530 may be altered. For example, when the nut 2540 may be threadably moved towards the hub 2100 by compressing the spring 2530, the tension of the spring 2530 may increase and the spring 2530 may push harder the blade base 2410 towards the hub 2100.

The rotor assembly 20 of the present embodiment may also include a plurality of bushings. For example, as shown in FIG. 5, the rotor assembly 20 may include a bushing 2600 configured within the blade base 2410 of the blade 2402. Further, the bushing 2600 may be adapted to slidably receive an end portion 2212 of the rod 2202. Specifically, when the blade base 2410 may slidably move along the rod 2202, the end portion 2212 of the rod 2202 may move back and forth through the bushing 2600. Similarly, the blade base 2410 of the blades 2404, 2406 may be configured with the bushings, such as the bushing 2600, and adapted to receive an end portion of the corresponding rods.

Figure 6:
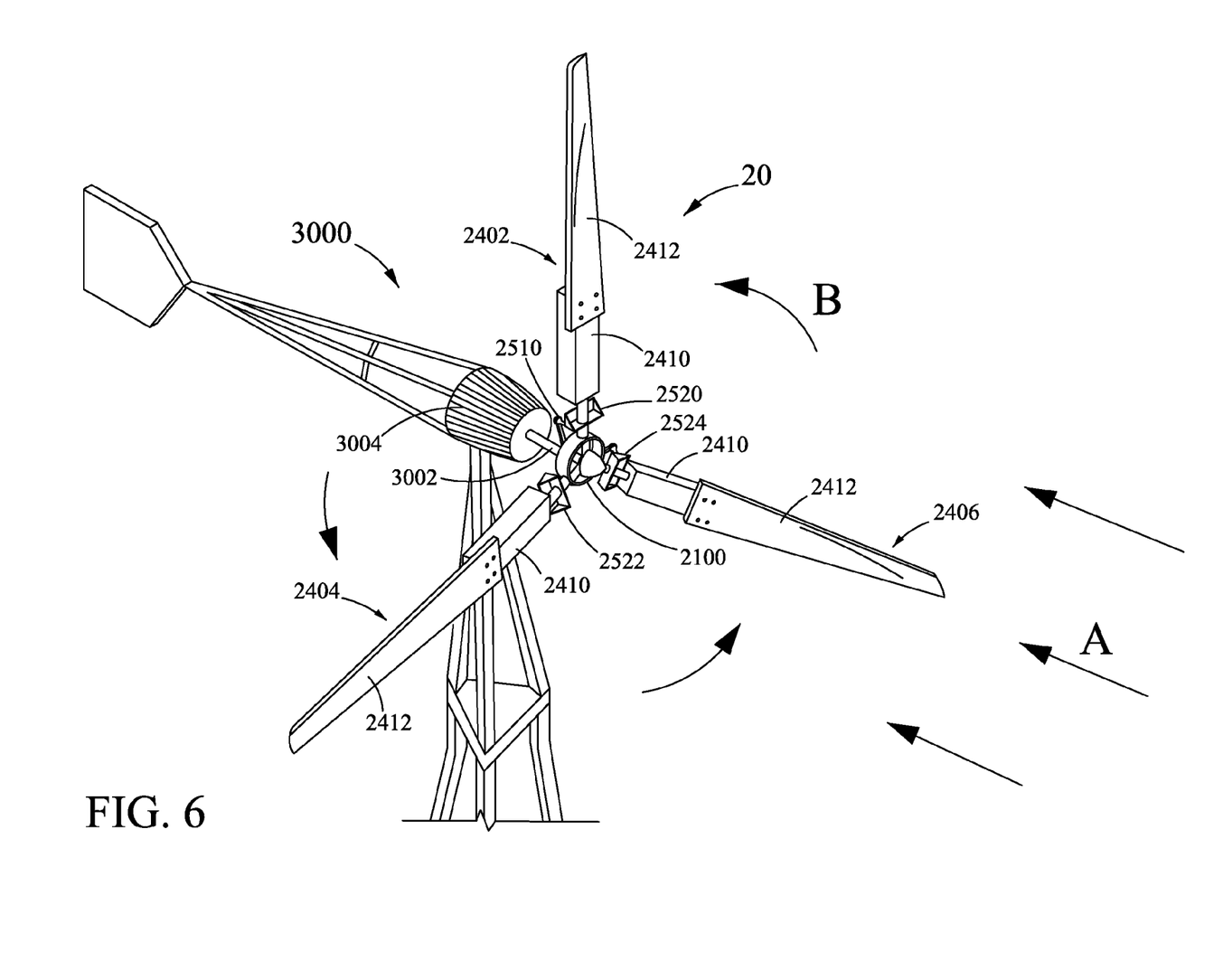
FIG. 6 is an environment in which the rotor assembly of FIG. 4 may be used in a wind turbine.

Referring now to FIG. 6, in use, the rotor assembly 20 of the present embodiment may be mounted on a shaft 3002 of a wind turbine 3000. Further, the synchronizer 2510 may be also received by a shaft 3002, prior to receiving the hub 2100. Moreover, the hub 2100 and the synchronizer 2510 may be rigidly coupled with the shaft 3002 using a suitable fastening means, such as bolts or allen screws.

The rotor assembly 20, particularly, the plurality of blades 2402, 2404, 2406 may start rotating with blowing wind (shown with arrows A). The rotation the plurality of blades 2402, 2404, 2406 (shown with arrows A) may in turn rotate the shaft 3002 for generating electricity. Specifically, the shaft 3002 may be operatively coupled with a generator 3004 for generating electricity. Initially, the plurality of blades 2402, 2404, 2406 may be oriented such that an angle of attack of the wind may be 25 degrees. It is to be understood that by adjusting the ball sockets and the synchronizer 2510, the plurality of blades 2402, 2404, 2406 may be adapted to be oriented such that the angle of attack of the wind may be 25 degrees on start-up.

The wind hits the plurality of blades 2402, 2404, 2406 and causes the plurality of blades 2402, 2404, 2406 to rotate in a counter clockwise direction. Specifically, the lift at the back of the plurality of blades 2402, 2404, 2406 may allow the plurality of blades 2402, 2404, 2406 to rotate and gain rotational speed, when the wind speed increases. The gain in the rotational speed causes a centrifugal force to come into play and causing the plurality of blades 2402, 2404, 2406 to move outwardly, away from the hub 2100. The outward movement of the plurality of blades 2402, 2404, 2406 may cause the compression of the plurality of springs, such as the spring 2530. Further, the plurality of blades 2402, 2404, 2406 may twist with the outward movement and the synchronizer 2510 may allow the plurality of blades 2402, 2404, 2406 to remain synchronized (face same angle of attack). The outward movement of the plurality of blades 2402, 2404, 2406 caused due to the centrifugal force further enables in gaining the rotational speed. The gain in the rotational speed may increase the lift and may decrease the drag on the plurality of blades 2402, 2404, 2406.

The further increase in the wind speed may cause the plurality of blades 2402, 2404, 2406 to attain the rated rpm. Therefore, when the wind speed further increases and the plurality of blades 2402, 2404, 2406 may tend to exceed the rated rpm, and the speed regulating mechanism 2500 may come into play for avoiding the over speeding of the plurality of blades 2402, 2404, 2406. Specifically, the increase in the wind speed may cause gain in the rotational speed of the plurality of blades 2402, 2404, 2406 which may change the angle of attack of the wind on the plurality of blades 2402, 2404, 2406. Further, the change in the angle of attack of wind may cause change in the lift and the drag on the plurality of blades 2402, 2404, 2406. The change in the angle of attack, the lift, and the drag causes the plurality of blades 2402, 2404, 2406 to slowdown (reduce the rotational speed).

Specifically, the plurality of springs may push the blade base 2410 of the plurality of blades 2402, 2404, 2406 towards the hub 2100 by overcoming the centrifugal force, when the plurality of blades 2402, 2404, 2406 may tend to exceed the rated rpm. Further, when the plurality of blades 2402, 2404, 2406 move towards the hub 2100, the plurality of blades 2402, 2404, 2406 may twist, and change the angle of attack of the wind thereon. This may change the lift and the drag on the plurality of blades 2402, 2404, 2406. The changing lift and the drag on the plurality of blades 2402, 2404, 2406 may cause the plurality of blades 2402, 2404, 2406 to flutter. The fluttering action of the plurality of blades 2402, 2404, 2406 may continue till the plurality of blades 2402, 2404, 2406 may attain the rated rpm and thereby avoiding the over speeding of the plurality of blades 2402, 2404, 2406. Further, when the wind speed reduces the rotational speed of the plurality of blades 2402, 2404, 2406 may also reduce. The reduction in the rotational speed of the plurality of blades 2402, 2404, 2406 may allow the plurality of springs to expand and push the plurality of blades 2402, 2404, 2406 towards the hub 2100. Therefore, when the wind ceases the plurality of blades 2402, 2404, 2406 may stop rotating and attain the initial position (25 degrees of angle of attack). In this position, the entire plurality of blades is used as a start-up root to get the plurality of blades moving in a low wind.

Based on the forgoing description, a rotor assembly, such as the rotor assemblies 10 or 20, may be adapted to regulate a rotational speed thereof with varying wind conditions/speeds. Specifically, a speed regulating mechanism, such as speed regulating mechanisms 400 and 2500, of the rotor assembly may be adapted to regulate a rotational speed of turbine blades. This allows a wind turbine to produce optimum output even with varying wind conditions/speeds. Further, the rotor assembly may be adapted to avoid the over-speeding of the turbine blades and thereby avoiding any damage of a wind turbine which may be caused due the over-speeding of the turbine blades.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, and thereby enable others skilled in the art to best utilize the disclosure and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present disclosure.

What is claimed is:
1. A rotor assembly for a wind turbine, the rotor assembly comprising:
    a hub adapted to be carried by a shaft of the wind turbine;
    a plurality of prop arms extending from the hub;

a plurality of blades carried by the plurality of prop arms; and a rotor speed regulating mechanism adapted to alter a pitch of the plurality of blades responsive to varying wind speeds, thereby regulating the speed of the plurality of blades, wherein the rotor speed regulating mechanism includes a synchronizer adapted to be carried by the shaft of the wind turbine and positioned adjacent to the hub, the synchronizer including     a central portion adapted to be mounted on the shaft,     a plurality of links extending from the central portion, and     a plurality of ball-and-socket couplers carried by the plurality of links, a plurality of blade shoes carried by the plurality of blades, the plurality of blade shoes being coupled with the plurality of ball and socket couplers, and     a plurality of springs extending from the hub to the plurality of blades.

2. The rotor assembly of claim 1, wherein the speed regulating mechanism further comprises a central connector coupling the plurality of springs with the hub, and a plurality of eyebolts coupling the plurality of springs with the plurality of blades.

3. The rotor assembly of claim 1, wherein each of the plurality of blades comprises a blade base adapted to be carried by a prop arm of the plurality of prop arms, and a blade plate coupled with the blade base.

4. A rotor assembly for a wind turbine, the rotor assembly comprising:

a hub adapted to be carried by a shaft of the wind turbine;

a plurality of rods coupled with the hub, each of the plurality of rods having a threaded portion;

a plurality of prop arms slidably carried by the plurality of rods;

a plurality of blades coupled with the plurality of prop arms, the plurality of blades adapted to receive the threaded portions of the plurality of rods; and a rotor speed regulating mechanism adapted to uniformly alter the pitch of the plurality of blades with different wind speed, thereby regulating the speed of the plurality of blades.

5. The rotor assembly of claim 4 wherein the rotor speed regulating mechanism includes a synchronizer adapted to be carried by the shaft of the wind turbine and positioned adjacent to the hub, the synchronizer including     a central portion adapted to be mounted on the shaft,     a plurality of links extending from the central portion, and     a plurality of ball and socket couplers carried by the plurality of links, a plurality of blade shoes carried by the plurality of prop arms, the plurality of blade shoes coupled with the plurality of ball and socket couplers, a plurality of springs encircling the plurality of rods, and a plurality of nuts carried by the threaded portions of the plurality of rods, the plurality of nuts adapted to be threadably moved for adjusting tension of the plurality of springs.

6. The rotor assembly of claim 5, further comprising a plurality of bushings configured within the plurality of blades, each of the plurality of bushings being adapted to slidably receive an end portion of a rod of the plurality of rods.

7. The rotor assembly of claim 5, wherein each of the plurality of blades comprises a blade base coupled with a prop arm of the plurality of prop arms, and a blade plate adapted to be coupled with the blade base.

* * * * *

UNITED STATES PATENT AND TRADEMARK OFFICE
CERTIFICATE OF CORRECTION

PATENT NO. : 8,821,121 B2
APPLICATION NO. : 12/966909
DATED : September 2, 2014
INVENTOR(S) : Carter Page 1 of 1

It is certified that error appears in the above-identified patent and that said Letters Patent is hereby corrected as shown below:

In the Specification

Column 1; line 37;   Please delete "affair".

Column 2; Line 7;   Please insert --of-- after view.

Column 7; Line 31;   Please delete "no now" and insert --now no--.

Column 7; Line 60;   Please insert --the-- before shape.

Column 10; Line 44;   Please insert --to-- before the.

Signed and Sealed this
Third Day of February, 2015

Michelle K. Lee
*Deputy Director of the United States Patent and Trademark Office*